Figure 1:
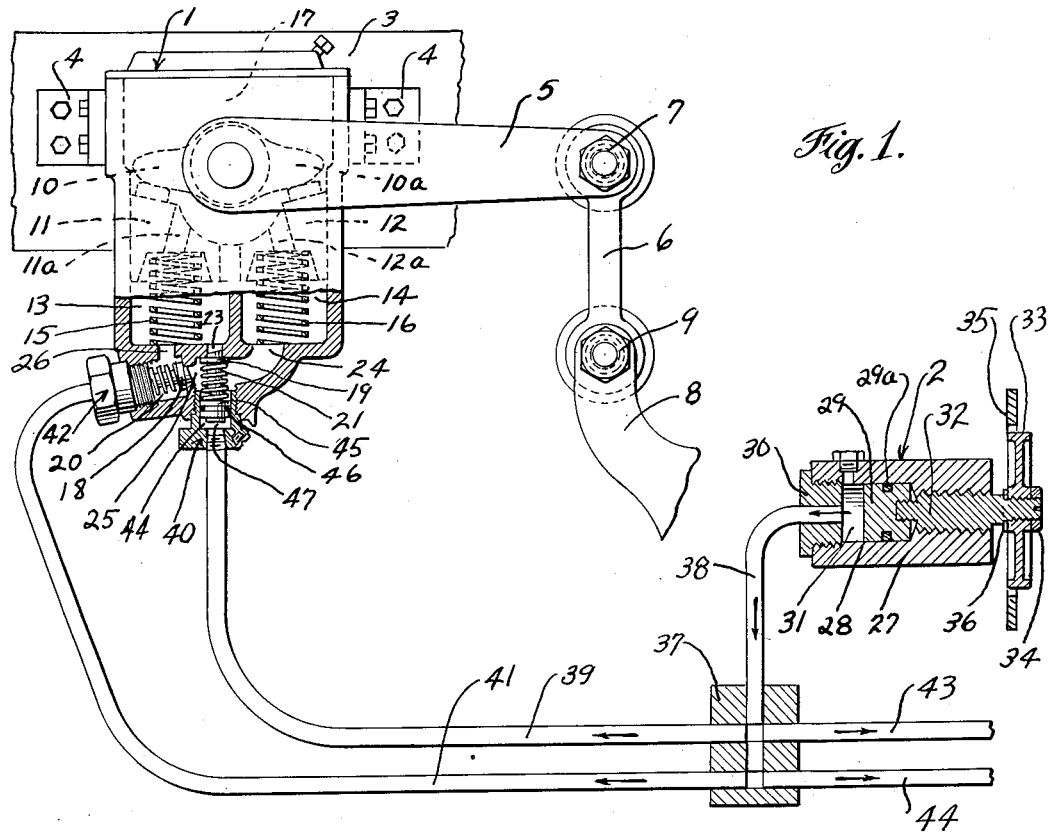

Sept. 20, 1955   J. A. LARGAY, JR   2,718,285
REMOTELY ADJUSTABLE SHOCK ABSORBER
Filed Dec. 26, 1952

INVENTOR
James A. Largay Jr.
Synnestvedt & Lechner
ATTORNEYS

United States Patent Office 2,718,285
Patented Sept. 20, 1955

2,718,285

REMOTELY ADJUSTABLE SHOCK ABSORBER

James A. Largay, Jr., Philadelphia, Pa.

Application December 26, 1952, Serial No. 328,109

4 Claims. (Cl. 188—88)

This invention relates to hydraulic apparatus, particularly to the control of such apparatus which is adapted to decelerate a moving body or to offer resistance to the movement of a body, and accomplishing this by means of fluid friction.

The invention is particularly adaptable to a wheel suspension system for automobiles, trucks, and the like. Such systems customarily employ on each wheel a spring connected with the axle thereof and with the frame of the vehicle together with shock absorber mechanism also connected with the axle and the frame. Strictly speaking, such springs are shock absorbers, but their primary function is to permit relative motion between the wheels and the frame so that when a rise or a depression on the road is encountered, the wheel can move upwardly or downwardly while the frame remains in its normal position. Shock absorbers are used in such systems to absorb the shock of road irregularities by dampening undesirable oscillations of the spring and preventing spring rebound, these factors, if not compensated for, causing jolting or sway of the frame. A further function of shocks is to enhance vertical stabilization of the vehicle when, for example, the vehicle is rounding a curve at pronounced speeds.

There are many types of shock absorbers used in such suspension systems, for example, the differential or airplane type, the double acting or balanced opposed piston type and the rotary type. Basically, all of these operate on the same general principle, that is to say, a piston moving in a cylinder forces oil from one side of the cylinder to the other, either through porting associated with the piston or through other porting interconnecting the two portions of the cylinder. The cylinder is ordinarily connected to the frame of the vehicle, while the piston is connected to an axle. Depending upon the type of shock, such porting may incorporate a restrictive orifice of given size or a spring-loaded relief valve which permits passage of the fluid only upon a given pressure level thereof, the valve acting in effect as a restrictive orifice. In such systems the energy of the forces causing relative movement between the cylinder and the piston is dissipated by the fluid friction forces, particularly as determined by the restrictive orifice.

The present invention is concerned with mechanism to control the size of such an orifice and/or to control the yield point of such a relief valve. The invention contemplates a master control unit located in the driver's compartment incorporating a master cylinder and piston, the piston being movable within the cylinder by certain operating mechanism adjustable by the driver. The master cylinder is connected to certain slave cylinders and pistons located on the shocks, the slave pistons being connected with mechanism to vary the tension on the springs of the relief valves and/or mechanism to control the size of an orifice.

The principal object of the invention is to provide a hydraulic control system whereby the action of the shock absorbers may be effected by the operator while the vehicle is in motion (or at rest) so as to control the riding qualities under different road or speed conditions.

Figure 2:
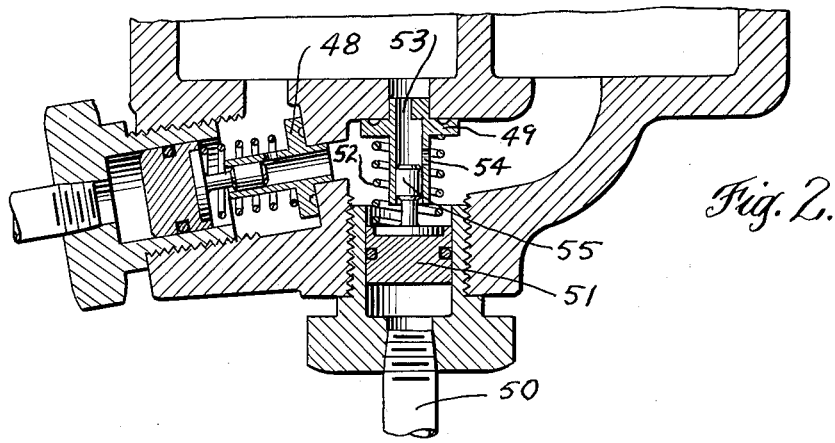

The manner in which the foregoing is accomplished, together with other objects and/or features, will be apparent from the description and drawing wherein:

Figure 1 is a view partially in section showing various of the components of the invention; and Figure 2 is a fragmentary sectional view illustrating another embodiment of the invention.

The general layout of the system is shown in Figure 1 wherein a shock absorber is indicated by the reference numeral 1 and the master control unit is indicated by the reference numeral 2. The invention will be described in connection with a double acting or balanced opposed piston type shock absorber, although it will be understood that the invention is adaptable to other types of shock absorbers.

Ordinarily a shock absorber such as indicated by the numeral 1 is located at each wheel interjacent the frame and the wheel axle. As shown, the shock 1 is secured to the frame 3 by brackets 4—4, or it may be secured to the frame in some other way, the manner of attachment depending upon the type of installation. The shock may be attached to the axle in the manner shown; for example, the shock has an arm 5 which is pivotally secured to the link 6 as by the pivot 7. The link 6 is pivotally secured to the mounting bracket 8 as by pivot 9. The mounting bracket 8 is then secured to the axle (not shown).

The arm 5 of the shock is fixedly attached to cams 10 and 10a, which are in abutting relationship with pistons 11 and 12 disposed in cylinders 13 and 14. The springs 15 and 16 keep the respective pistons in engagement with the cams. The pistons have small ports 11a and 12a, which permit fluid flow between the upper and lower portions of the cylinders 13 and 14. The upper portions of the cylinders are ordinarily termed reservoirs and are interconnected, for example, by a passage 17.

On the bottom part of the shock are located relief valves 18 and 19, which are held in their respective seats by the springs 20 and 21.

The operation of the shock is as follows. When, for example, a rise on the road is encountered, the axle and bracket 8 move upwardly. This action through the link 6 moves the arm 5 upwardly. The cam 10 and consequently the piston 11 are moved downwardly, while the cam 10a moves upwardly with the piston 12 following the cam as urged by the spring 16. If a depression is encountered, the bracket 8 moves downwardly, thus moving the cam 10 and piston 11 up and the cam 10a and the piston 12 down. It will be observed that when either the piston 11 or 12 moves upwardly or downwardly, fluid will be passed between the upper and lower portions of the cylinders. Where the impact due to a rise or a depression is under a certain amount, the pistons will tend to oscillate back and forth in their cylinders, thus damping out the effect of the unevenness on the road. In certain applications, a fixed orifice may be incorporated in one or both of the valves to enhance the oscillations.

When a severe rise or depression is encountered, the pistons are forced to move very rapidly and, with the ports 11a and 12a having only a small capacity, certain pressure will be developed in one or the other lower portions of the cylinders. For example, when a severe rise is encountered, piston 11 will tend to be moved downwardly rapidly, and if sufficient fluid pressure is developed, the tension of spring 21 on relief valve 19 will be overcome and fluid will flow from the lower portion of cylinder 13 through the passage 23, past the open valve 19, through passage 24 into the lower portion of the cylinder 14. Where a severe depression is encountered, the piston 12, moving downwardly, will develop sufficient pressure to overcome the effect of spring 20, the valve 18 will rise from its seat and fluid will flow from the lower portion of cylinder 14 through the passage 24, past the valve 19, through the port 25, past the open valve 18, through the port 26 and into the lower portion of cylinder 13. In either of the foregoing instances, the displacement of fluid due to the movement of the piston will be compensated for by fluid flow through the ports 11a and 12a and through the reservoir.

The point at which valves such as 19 and 20 yield has an important bearing on the riding qualities of a vehicle. As will be apparent, the riding qualities of the car under varying road conditions measurably affect the ability of the driver to keep the car under control.

Where a road bed is relatively free from bumps or the like and a car is operating at high speeds, proper control of the car is enhanced where the yield point is very high so that relative motion between the frame and the axles is at a minimum. This tends to vertically stabilize the car and eliminate dangerous lateral sway that might be otherwise present due to road curvature or to prevent longitudinal sway due to road bed swells or the like.

Further, for proper car control, it is desirable to permit adjustment of the yield point as between road conditions such as a very rough cobblestone road, and a relatively smooth road such as brick or macadam. In rough road conditions, at low speed it is desirable that the yield point be very low so as to enhance frame stabilization by permitting the relatively free upward and downward movement of the axles, or on rough roads at high speeds, the yield point should be high so as to prevent free movement of the axles.

The master cylinder and slave pistons and cylinders associated therewith are utilized to control the yield point of the valves. The master control unit, which is located within easy reach of the operator, comprises a housing 27 presenting a master cylinder 28, within which is disposed the cylinder 29. The fitting 30 is attached to the casing and the space between the piston and the fitting forms a compression chamber 31. The piston 29 is equipped with an "O" ring seal, and the interior of the cylinder is highly polished to a mirror-like finish. The use of the highly polished cylinder in conjunction with the "O" ring seal makes for a very tight system. The piston is secured to one end of a threaded shaft 32, these threads mating with corresponding threads in the casing. A knob 33 is threaded on the other end of the shaft and secured thereto by nut 34. A dial 35 is held in a fixed position (by means not shown) adjacent the knob 33. The dial may be calibrated in accordance with the particular application of the device; for example, in passenger cars it may be calibrated "rough," "intermediate" and "smooth."

Although the means for moving the piston 29 may take a variety of forms, I prefer the arrangement shown, because it makes for accurate coordination between the angular rotation of the knob and piston displacement. Furthermore, the threaded arrangement firmly secures the piston in its adjusted position and prevents movement thereof when pressure is transferred from the shocks to the chamber 31 when a valve is opened.

In order that the knob 33 may be properly oriented with the dial, I have provided shims 36, which bear on a ledge on the shaft. When the shaft is rotated so that the piston is all the way to the right, the knob may be shimmed on the shaft so that the knob indicator is at, for example, the "rough" point.

The compression chamber 31 is connected to the fitting 37 via the line 38. From the fitting the line 39 carries fluid to the slave fitting 40, while line 41 carries fluid to the slave fitting 42. The lines 43 and 44 carry fluid to a shock (not shown) having an arrangement identical with that of shock 1. The fitting also carries fluid to the other two shocks associated with the other wheels on the vehicle.

Both of the slave fittings are identically arranged and only fitting 40 will be described. The fitting 40 presents a slave cylinder 44 having a slave piston 45. Similarly as described in connection with piston 29, the piston 45 has an O ring seal 46 and the cylinder 44 is highly polished. The space between the bottom of the cylinder and the bottom of the piston forms a compression chamber 47. As will be apparent, the spring 21 is in abutting relationship with the piston 45.

The operation of the device is as follows. When the knob 33 is rotated clockwise, the piston 29 moves to the left and displaces a certain amount of fluid. This causes each one of the slave pistons connected with the chamber 31 to move an equal amount. For example, the piston 45 moves upwardly and compresses the spring 21. As the piston 29 is moved further to the left, the tension on the springs is increased. When the knob 33 is rotated counter-clockwise, the piston 29 moves to the right and decreases the tension on the springs.

Another embodiment of the invention is shown in Figure 2. The valves 48 and 49 are identical in construction and description will be made only with reference to valve 49. The line 50 is connected with the master control unit. The slave piston 51 is connected with the spring 52 and is adapted to vary the tension thereof in a manner similar to that described above. In this embodiment the valve 49 is provided with a hollow porton 53 connected with the port 54, this arrangement permitting the flow of fluid between the two cylinders. The slider 55, which is connected to and movable with the slave piston 51, is adapted to move within the hollow portion 53. Thus, when the slave piston 51 is moved to increase the tension of spring 52, the slider moves within the hollow portion 53 to partially or entirely close off the port 54.

I claim:

1. A hydraulic ride control comprising: a pair of main cylinders and a piston in each main cylinder arranged to reciprocate in opposite directions; a pair of independent passages interconnecting respective sides of the main cylinders, the movements of said pistons urging fluid flow through said passages; means to control the flow of fluid through said pair of passages including two spring-loaded relief valves, one being disposed in one passage and the other being disposed in the other passage, the valves being arranged whereby the respective passages pass fluid in opposite directions; and means to control the operation of the valves including for each valve a control piston operably connected with the spring thereof and a control cylinder for the piston, and further including a manually operable piston mounted in a cylinder for developing hydraulic pressure, the cylinder having fluid connections with each of said control cylinders whereby to move the control pistons to control the tension of said springs.

2. A construction in accordance with claim 1 wherein each said valve has an axial bore and a port between the bore and the exterior of the valve, said bore and said port being adapted to conduct fluid between the respective main cylinders and a slider disposed within said bore connected to and movable with the control piston whereby actuation of said manually operable piston controls the flow of fluid through the port and bore.

3. Hydraulic ride control apparatus for use with a wheeled vehicle such as an automobile or the like comprising: a pair of main cylinders each having a piston arranged respectively to reciprocate in opposite directions therein; a pair of fluid ports in one main cylinder; a relief valve in one of said ports adapted to pass fluid into said one main cylinder; a relief valve in the other of said ports arranged to pass fluid out of said one main cylinder; a port in the other of said main cylinders adapted to pass fluid in and out of the cylinder and being in communication with said relief valves; means to control the operation of the relief valves including for each valve a spring, a control piston connected with the spring and a control cylinder; and a manually operable piston mounted in a cylinder for developing hydraulic pressure, the cylinder being connected with each of said control cylinders whereby to move the control pistons and control the tension of said springs.

4. A construction in accordance with claim 3 wherein each said valve has an axial bore and a port between the bore and the exterior of the valve, said bore and said port being adapted to conduct fluid between the respective main cylinders and a slider disposed within said bore and connected to and movable with the control piston whereby actuation of said manually operable piston controls the flow of fluid through the port and bore.

References Cited in the file of this patent

UNITED STATES PATENTS

| Number | Name | Date |
|---|---|---|
| 1,912,092 | Parker | May 30, 1933 |
| 1,930,282 | Olley | Oct. 10, 1933 |
| 2,000,132 | Gray | May 7, 1935 |
| 2,117,643 | Armstrong | May 17, 1938 |
| 2,191,942 | Rossman et al. | Feb. 27, 1940 |
| 2,380,309 | Hicks | June 10, 1945 |
| 2,389,849 | Gruss | Nov. 27, 1945 |
| 2,608,403 | Luther | Aug. 26, 1952 |